(12) United States Patent
Harashima et al.

(10) Patent No.: US 6,362,267 B1
(45) Date of Patent: Mar. 26, 2002

(54) POWDER COATING COMPOSITION

(75) Inventors: Isao Harashima; Masayuki Takahashi; Junto Suzuki; Nobuo Takezawa, all of Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 0 days.

(21) Appl. No.: 09/531,594

(22) Filed: Mar. 20, 2000

(30) Foreign Application Priority Data

Mar. 23, 1999 (JP) ............................................ 11-077059

(51) Int. Cl.⁷ ................................................. C08K 3/34
(52) U.S. Cl. ........................ 524/444; 524/442; 524/494
(58) Field of Search ................................ 524/494, 442, 524/444

(56) References Cited

U.S. PATENT DOCUMENTS 5,856,378 A * 1/1999 Ring et al. .................. 523/205

* cited by examiner

Primary Examiner—Edward J. Cain
(74) Attorney, Agent, or Firm—Banner & Witcoff, Ltd.

(57) ABSTRACT

A powder coating composition according to the present invention is used in the coating of a molded product having wrinkles, cavities and the like in its surface. The powder coating composition contains a single film forming resin or a plurality of film forming resins having a melt viscosity of 60 Pa·s/165° C. or less and selected from the group consisting of an epoxy resin, a polyester resin and an acrylic resin, and at least two fillers having different particle size in a range of 3 to 100 μm. Thus, the powder coating composition is applied directly onto a to-be-coated-surface without need for a pretreatment such as the sanding of the surface and the filling of the surface by a patty. Therefore, a molding failure of the surface can be hidden satisfactorily to form a coated surface excellent in design. Moreover, an organic solvent or the like is not used, and hence, the air pollution is prevented, and the danger of a fire is reduced remarkably.

4 Claims, No Drawings

POWDER COATING COMPOSITION

BACKGROUND OF THE INVENTION

1. Field of the Invention

The present invention relates to a powder coating composition used to coat a molded product having wrinkles and cavities in its surface, such as a die-cast product, an extrudate or an injection-molded product made from a zinc alloy, an aluminum alloy, a magnesium alloy and the like, and particularly, to a powder coating composition which is suited to be applied directly onto a to-be-coated-surface without need for a pretreatment such as the sanding of the surface and the filling of the surface by a patty, thereby hiding a molding failure of the surface satisfactorily to form a coated surface excellent in design, and which does not require the use of an organic solvent or the like, whereby an air pollution is prevented, and the danger of a fire is reduced remarkably.

2. Description of the Related Art

Molded products made from various alloys such as zinc, aluminum and magnesium alloys, other metals and various plastic materials, are usually formed by a die-casting, an extrusion, an injection molding and the like. In such molded products, fine grooves called wrinkles, small bores called cavities and the like are created in their surfaces, thereby causing the coating defects due to these fine grooves and small bores are caused.

It is a conventional practice to coat such a molded product through many steps, such as steps of prime-coating and face-coating of the surface of the molded product which is to be coated, using a solvent-type coating material and the like, after the pretreatment of the surface such as the sanding, the filling by a patty and the like.

For this reason, the above-described coating process suffers from a problem that not only the coating steps are complicated, but also the use of the solvent-type coating material causes the air pollution, the dangers of the generation of a fire and the like.

SUMMARY OF THE INVENTION

Accordingly, it is an object of the present invention to provide a powder coating composition, which is coated directly onto the surface of a molded product having wrinkles, cavities and the like in its surface without the pretreatment such as the sanding of a surface to be coated, the filling of the surface by a patty and the like, whereby the coating process is simplified, and a molding failure of the surface is hidden satisfactorily, thereby forming a coated surface having an excellent design property, and which does not use a solvent such as an organic solvent, whereby the air pollution due to the solvent is prevented and the danger of a fire is reduced remarkably, thereby overcoming the drawbacks associated with the prior art.

To achieve the above object, according to the present invention, there is provided a powder coating composition for use in the coating of a molded product having wrinkles, cavities and the like in its surface, comprising a single film forming resin or a plurality of film forming resins having a melt viscosity of 60 Pa·s/165° C. or less and selected from the group consisting of an epoxy resin, a polyester resin and an acrylic resin, and at least two fillers having different particle size in a range of 3 to 100 $\mu$m.

When the powder coating composition according to the present invention is applied onto a molded product having wrinkles and/or cavities in its surface and formed by a die-casting process, an extruding process, an injection-molding process and the like from any of various alloys such as a zinc alloy, an aluminum alloy, a magnesium alloy and the like, other types of metals, and various plastic materials, the following effects are provided:

(1) A pretreatment such as sanding, a patty-filling of a surface to be coated is not required, and the powder coating composition can be applied directly to the surface to be coated, leading to simplified coating steps;

(2) The molding failure of the surface to be coated can be hidden satisfactorily;

(3) It is possible to form a coated surface which is excellent in design property (realization of a pattern); and (4) A solvent such as an organic solvent and the like is not used and hence, the air pollution by a solvent is prevented, and the danger of a fire is reduced remarkably.

DETAILED DESCRIPTION OF THE INVENTION

The present invention will now be described in detail.

A powder coating composition according to the present invention basically contains a film forming resin and a filler.

Examples of the film forming resin is an epoxy resin, a polyester resin, an acrylic resin and the like. These resins are used alone or in combination of two or more of them. Fine grooves due to wrinkles, small bores due to cavities and the like formed in the surface of a molded product are hidden by using the film forming resin.

The filler used in the present invention comprises an organic or inorganic powder having an average particle size in a range of 3 to 100 $\mu$m. According to the present invention, at least two types of such fillers having different particle sizes are used in combination.

Examples of organic fillers are nylon, polyacrylonitrile, polymethylmethacrylate (PMMA), benzo-guanamine resin, a polyester resin, a silicone resin, polytetrafluoroethylene (PTFE), polystyrene, polyethylene, a phenol resin, a polyurethane resin, collagen, and the like. Examples of inorganic fillers are ceramics, shirasu, glass, settleable barium, calcium carbonate, alumina, quartz, clay, mica, metal powder and the like.

Examples of the combination of at least two fillers are the combination of organic fillers, the combination of organic and inorganic fillers and the combination of inorganic fillers. It is preferable that one of the two fillers has an average particle size in a range of 5 to 50 $\mu$m.

Examples of preferred combinations of fillers are the combination of a glass filler having an average particle size of 18 $\mu$m and a polyacrylonitrile having an average particle size of 20 $\mu$m, the combination of a feldspar powder having an average particle size of 4.5 $\mu$m and a polyester filler having an average particle size of 20 $\mu$m, the combination of a feldspar filler having an average particle size of 4.5 $\mu$m and a polyacrylonitrile filler having an average particle size of 15 $\mu$m, the combination of a polyacrylonitrile filler having an average particle size of about 20 $\mu$m and a polyester filler having an average particle size of 20 $\mu$m, the combination of a glass filler having an average particle size of 18 $\mu$m and a ceramic filler having an average particle size of 45 $\mu$m, and the like.

According to the present invention, the use of the two types of fillers ensures that the blister of a coating film due to cavities is overcome; wrinkles are hidden, and the uniformity of the appearance of the coating film is enhanced.

The composition according to the present invention may contains, in addition to the above-described film forming resin(s) and the fillers, any of a pigment, a curing agent, a curing promoter, a flow regulator and other various conventionally used additives in any suitable amount.

The fillers may be blended with the film forming resin in the composition according to the present invention, so that the amount of the fillers is in a range of 5 to 200 parts by weight per 100 parts by weight of the film forming resin. If the amount of the fillers exceeds 200 parts by weight, problems of a leveling failure and of generation of cracks are arisen. If the amount of the fillers is smaller than 5 parts by weight, an effect of preventing the blister of a coating film is insufficient.

According to the present invention, the film forming resin, the fillers and anyother additives are uniformly mixed together in required amounts, for example, in a super-mixer. The mixture is placed into an extruder, where it is heated into a molten state at a temperature in a range of 120° C. to 200° C. and kneaded. Then, the resulting mixture is extruded from the extruder, and cooled and pulverized into an average particle size in a range of 5 to 60 μm by an atomizer or the like, thereby producing a powder coating material according to the present invention.

All the two or more types of fillers according to the present invention may be mixed with other constituents and then charged into the extruder. Alternatively, only at least one of the fillers may be mixed with the other constituents, and the mixture may be kneaded and pulverized in the extruder to provide a powder coating material. Then, the remaining filler(s) may be mixed with the powder coating material. In order to enhance the pattern realization and the blister preventing effect, the latter process having the first step of mixing at least one of the fillers to provide the powder coating material is preferred.

EXAMPLES

Examples of the present invention will now be described in detail, and the advantages of the present invention will be described by comparison with comparative examples.

Example 1

The following constituents were mixed uniformly in a super-mixer: 48 parts by weight of a polyester resin (Uralac P2504 made by DSM, Co., and having a melt-viscosity in a range of 25 to 50 Pa·s/165° C.), 12 parts by weight of a curing agent (Vestagon B1530 made by Huels, co.), 30 parts by weight of titanium oxide (CR-50 made by Ishihara, Sangyo, Co.), 8 parts by weight of a glass filler (GB731M made by Toshiba Ballotini, Co., and having an average particle size of 18 μm), 0.9 parts by weight of a flow regulator (Byk362P made by Byk-Chemie, Co.), 0.6 parts by weight of a curing promoter (dibutyl-tin-dilaurate), and 0.5 parts by weight of benzoin.

The resulting mixture was then charged into an extruder, where it was heated into a molten state at a temperature of 120 to 130° C. and kneaded. Then, the mixture was extruded from the extruder and cooled and thereafter, was pulverized into an average particle size of about 40 μm by an atomizer.

Further, 20 parts by weight of a polyacrylonitrile filler (Rubcouleur 030 (F) Clear made by Dainichiseika Color & Chemicals Mfg., Co., Ltd., and having an average particle size of 20 μm) and 0.5 parts by weight of a flow regulator (a fine silica powder) per 100 parts by weight of the powder produced in the above manner were added to and uniformly mixed with the powder, thereby producing a powder coating composition according to the present invention.

The produced powder coating composition was applied to each of cleaned injection-molded products of an aluminum alloy by an electric-field flowing electrostatic coating machine (a simplified tester) made by Mesac, Co., and cured at 180° C. for 20 minutes, thereby forming a coating film having a thickness of 20 to 50 μm. Each of the coating films was observed for examination of the realization of a pattern, the uniformity of the coating film, the presence or absence of blisters of the coating film and the hiding of wrinkles. Results are shown in Table 1.

Example 2

The following constituents were mixed uniformly in a super-mixer: 48 parts by weight of a polyester resin (Uralac P2504 made by DSM, Co., and having a melt-viscosity in a range of 25 to 50 Pa·s/165° C.), 12 parts by weight of a curing agent (Vestagon B1530 made by Huels, co.), 30 parts by weight of titanium oxide (CR-50 made by Ishihara, Sangyo, Co.), 8 parts by weight of a feldspar powder (Minex 7 made by Shiraishi Industries, Co., and having an average particle size of 4.5 μm), 0.9 parts by weight of a flow regulator (Byk362P made by Byk-Chemie, Co.), 0.6 parts by weight of a curing promoter (dibutyl-tin-dilaurate), and 0.5 parts by weight of benzoin.

The resulting mixture was then charged into an extruder, where it was heated into a molten state at a temperature of 120 to 130° C. and kneaded. Then, the mixture was extruded from the extruder and cooled and thereafter, was pulverized into an average particle size of about 40 μm by an atomizer.

Further, 10 parts by weight of a polyester filler (Barinax FC-400PK made by Mitsui Chemistry, Co., and having an average particle size of 20 μm) and 0.5 parts by weight of a flow regulator (a fine silica powder) per 100 parts by weight of the powder produced in the above manner were added to and uniformly mixed with the powder, thereby producing a powder coating composition according to the present invention.

The produced powder coating composition was applied to each of cleaned injection-molded products of an aluminum alloy by an electric-field flowing electrostatic coating machine (a simplified tester) made by Mesac, Co., and cured at 180° C. for 20 minutes, thereby forming a coating film having a thickness of 20 to 50 μm. Each of the coating films was observed for examination of the realization of a pattern, the uniformity of the coating film, the presence or absence of blisters of the coating film and the hiding of wrinkles. Results are shown in Table 1.

Example 3

The following constituents were mixed uniformly in a super-mixer: 36 parts by weight of a polyester resin (Uralac P2610 made by DSM and having a melt-viscosity in a range of 12.5 to 25 Pa·s/165° C.), 24 parts by weight of an epoxy resin (Araldite GT7004 made by CibaGeigy, Co.), 30 parts by weight of titanium oxide (CR-50 made by Ishihara, Sangyo, Co.), 8.6 parts by weight of a glass filler (GB731M made by Toshiba Ballotini, Co., and having an average particle size of 18 μm), 0.9 parts by weight of a flow regulator (Byk362P made by Byk-Chemie, Co.), and 0.5 parts by weight of benzoin.

The resulting mixture was then charged into an extruder, where it was heated into a molten state at a temperature of 120° C. and kneaded. Then, the mixture was extruded from the extruder and cooled and thereafter, was pulverized into an average particle size of about 40 μm by an atomizer.

Further, 20 parts by weight of a polyacrylonitrile filler (Rabcoroll 030 (F) Clear made by Dainichiseika Color & Chemicals Mfg., Co., Ltd., and having an average particle size of 20 μm) and 0.5 parts by weight of a flow regulator (a fine silica powder) per 100 parts by weight of the powder produced in the above manner were added to and uniformly mixed with the powder, thereby producing a powder coating composition according to the present invention.

The produced powder coating composition was applied to each of cleaned injection-molded products of an aluminum alloy by an electric-field flowing electrostatic coating machine (a simplified tester) made by Mesac, Co., and cured at 180° C. for 20 minutes, thereby forming a coating film having a thickness of 20 to 50 μm. Each of the coating films was observed for examination of the realization of a pattern, the uniformity of the coating film, the presence or absence of blisters of the coating film and the hiding of wrinkles. Results are shown in Table 1.

Example 4

The following constituents were mixed uniformly in a super-mixer: 51 parts by weight of a polyester resin (Finedick M-8020 made by Dainippon Ink Chemical Industries, Co., and having a melt-viscosity of 60 Pa·s/165° C.), 9 parts by weight of a curing agent (Cleran UI made by Bayer, Co.), 30 parts by weight of titanium oxide (CR-50 made by Ishihara, Sangyo, Co.), 9 parts by weight of a feldspar powder (Minex 7 made by Shiraishi Industries, Co., and having an average particle size of 4.5 μm), 0.5 parts by weight of a flow regulator (Byk362P made by Byk-Chemie, Co.), 0.1 parts by weight of a curing promoter (dibutyl-tin-dilaurate), and 0.4 parts by weight of benzoin.

The resulting mixture was then charged into an extruder, where it was heated into a molten state at a temperature of 120 to 130° C. and kneaded. Then, the mixture was extruded from the extruder and cooled and thereafter, was pulverized into an average particle size of about 40 μm by an atomizer.

Further, 20 parts by weight of a polyacrylonitrile filler (ArtPearl 400 Chlo made by Negami Industries, Co., and having an average particle size of 15 μm) and 0.5 parts by weight of a flow regulator (a fine silica powder) per 100 parts by weight of the powder produced in the above manner were added to and uniformly mixed with the powder, thereby producing a powder coating composition according to the present invention.

The produced powder coating composition was applied to each of cleaned injection-molded products of an aluminum alloy by an electric-field flowing electrostatic coating machine (a simplified tester) made by Mesac, Co., and cured at 180° C. for 20 minutes, thereby forming a coating film having a thickness of 20 to 50 μm. Each of the coating films was observed for examination of the realization of a pattern, the uniformity of the coating film, the presence or absence of blisters of the coating film and the hiding of wrinkles. Results are shown in Table 1.

Example 5

The following constituents were mixed uniformly in a super-mixer: 39.4 parts by weight of a polyester resin (Uralac P2610 made by DSM, Co., and having a melt-viscosity of 12.5 to 25 Pa·s/165° C.), 26.3 parts by weight of an epoxy resin (Arakdite GT7004 made by CibaGeigy, Co.), 30 parts by weight of titanium oxide (CR-50 made by Ishihara, Sangyo, Co.), 0.9 parts by weight of a flow regulator (Byk362P made by Byk-Chemie, Co.), and 0.5 parts by weight of benzoin.

The resulting mixture was then charged into an extruder, where it was heated into a molten state at a temperature of 120 to 130° C. and kneaded. Then, the mixture was extruded from the extruder and cooled and thereafter, was pulverized into an average particle size of about 40 μm by an atomizer. Further, 10 parts by weight of a polyacrylonitrile filler (Rabcoroll 030 (F) Clear made by Dainichiseika Color & Chemicals Mfg., Co., Ltd., and having an average particle size of 20 μm), 5 parts by weight of a polyester filler (Barinax FC-400PK made by Mitsui Chemistry, Co., and having an average particle size of 20 μm) and 0.5 parts by weight of a fine silica powder per 100 parts by weight of the powder produced in the above manner were added to and uniformly mixed with the powder, thereby producing a powder coating composition according to the present invention.

The produced powder coating composition was applied to each of cleaned injection-molded products of an aluminum alloy by an electric-field flowing electrostatic coating machine (a simplified tester) made by Mesac, Co., and cured at 180° C. for 20 minutes, thereby forming a coating film having a thickness of 20 to 50 μm. Each of the coating films was observed for examination of the realization of a pattern, the uniformity of the coating film, the presence or absence of blisters of the coating film and the hiding of wrinkles. Results are shown in Table 1.

Example 6

The following constituents were mixed uniformly in a super-mixer: 36 parts by weight of a polyester resin (Uralac P2610 made by DSM and having a melt-viscosity in a range of 12.5 to 25 Pa·s/165° C.), 24 parts by weight of an epoxy resin (Araldite GT7004 made by CibaGeigy, Co.), 30 parts by weight of titanium oxide (CR-50 made by Ishihara, Sangyo, Co.), 8.6 parts by weight of a glass filler (GB731M made by Toshiba Ballotini, Co., and having an average particle size of 18 μm), 0.9 parts by weight of a flow regulator (Byk362P made by Byk-Chemie, Co.), and 0.5 parts by weight of benzoin.

The resulting mixture was then charged into an extruder, where it was heated into a molten state at a temperature of 120° C. and kneaded. Then, the mixture was extruded from the extruder and cooled and thereafter, was pulverized into an average particle size of about 40 μm by an atomizer. Further, 10 parts by weight of a ceramic filler (MICROCELLS SL75 made by Chichibu Onoda, Co., and having an average particle size of 45 μm) and 0.5 parts by weight of a fine silica powder per 100 parts by weight of the powder produced in the above manner were added to and uniformly mixed with the powder, thereby producing a powder coating composition according to the present invention.

The produced powder coating composition was applied to each of cleaned injection-molded products of an aluminum alloy by an electric-field flowing electrostatic coating machine (a simplified tester) made by Mesac, Co., and cured at 180° C. for 20 minutes, thereby forming a coating film having a thickness of 20 to 50 μm. Each of the coating films was observed for examination of the realization of a pattern, the uniformity of the coating film, the presence or absence of blisters of the coating film and the hiding of wrinkles. Results are shown in Table 1.

Comparative Example 1

The following constituents were mixed uniformly in a super-mixer: 36 parts by weight of a polyester resin (Uralac P2610 made by DSM and having a melt-viscosity in a range of 12.5 to 25 Pa·s/165° C.), 24 parts by weight of an epoxy resin (Araldite GT7004 made by CibaGeigy, Co.), 30 parts by weight of titanium oxide (CR-50 made by Ishihara, Sangyo, Co.), 8.6 parts by weight of settleable barium (Settleable Barium 100 made by Sakai Chemistry, Co., and having an average particle size of 0.6 μm), 0.9 parts by weight of a flow regulator (Byk362P made by Byk-Chemie, Co.), and 0.5 parts by weight of benzoin.

The resulting mixture was then charged into an extruder, where it was heated into a molten state at a temperature of 120° C. and kneaded. Then, the mixture was extruded from the extruder and cooled and thereafter, was pulverized into an average particle size of about 40 μm by an atomizer.

Further, 0.5 parts by weight of a flow regulator (a fine silica powder) per 100 parts by weight of the powder produced in the above manner was added to and uniformly mixed with the powder, thereby producing a powder coating composition of Comparative Example 1.

The produced powder coating composition was applied to each of cleaned injection-molded products of an aluminum alloy by an electric-field flowing electrostatic coating machine (a simplified tester) made by Mesac, Co., and cured at 180° C. for 20 minutes, thereby forming a coating film having a thickness of 20 to 50 μm. Each of the coating films was observed for examination of the realization of a pattern, the uniformity of the coating film, the presence or absence of blisters of the coating film and the hiding of wrinkles. Results are shown in Table 1.

Comparative Example 2

The following constituents were mixed uniformly in a super-mixer: 39.5 parts by weight of a polyester resin (Uralac P2610 made by DSM and having a melt-viscosity in a range of 12.5 to 25 Pa·s/165° C.), 26.3 parts by weight of an epoxy resin (Araldite GT7004 made by CibaGeigy, Co.), 32.8 parts by weight of titanium oxide (CR-50 made by Ishihara, Sangyo, Co.), 0.9 parts by weight of a flow regulator (Byk362P made by Byk-Chemie, Co.), and 0.5 parts by weight of benzoin.

The resulting mixture was then charged into an extruder, where it was heated into a molten state at a temperature of 120° C. and kneaded. Then, the mixture was extruded from the extruder and cooled and thereafter, was pulverized into an average particle size of about 40 μm by an atomizer.

Further, 20 parts by weight of a polyacrylonitrile filler (Rabcoroll 030 (F) Clear made by Dainichiseika Color & Chemicals Mfg., Co., Ltd., and having an average particle size of 20 μm), and 0.5 parts by weight of a flow regulator (a fine silica powder) per 100 parts by weight of the powder produced in the above manner was added to and uniformly mixed with the powder, thereby producing a powder coating composition of Comparative Example 2.

The produced powder coating composition was applied to each of cleaned injection-molded products of an aluminum alloy by an electric-field flowing electrostatic coating machine (a simplified tester) made by Mesac, Co., and cured at 180° C. for 20 minutes, thereby forming a coating film having a thickness of 20 to 50 μm. Each of the coating films was observed for examination of the realization of a pattern, the uniformity of the coating film, the presence or absence of blisters of the coating film and the hiding of wrinkles. Results are shown in Table 1.

Comparative Example 3

The following constituents were mixed uniformly in a super-mixer: 51 parts by weight of a polyester resin (Finedick M-8010 made by Dainippon Ink Chemical Industries, Co., and having a melt-viscosity in a range of 200 Pa·s/165° C.), 9 parts by weight of a curing agent (Clerane UI made by Bayer, Co.), 30 parts by weight of titanium oxide (CR-50 made by Ishihara, Sangyo, Co.), 9 parts by weight of a glass filler (GB731M made Toshiba Ballotini, Co., and having an average particle size of 18 μm), 0.5 parts by weight of a flow regulator (Byk362P made by Byk-Chemie, Co.), 0.1 part by weight of a curing promoter (dibutyl-tin-dilaurate), and 0.4 parts by weight of benzoin.

The resulting mixture was then charged into an extruder, where it was heated into a molten state at a temperature of 120° C. and kneaded. Then, the mixture was extruded from the extruder and cooled and thereafter, was pulverized into an average particle size of about 40 μm by an atomizer.

Further, 20 parts by weight of a polyacrylonitrile filler (Rabcoroll 030 (F) Clear made by Dainichiseika Color & Chemicals Mfg., Co., Ltd., and having an average particle size of 20 μm), and 0.5 parts by weight of a flow regulator (a fine silica powder) per 100 parts by weight of the powder produced in the above manner was added to and uniformly mixed with the powder, thereby producing a powder coating composition of Comparative Example 3.

The produced powder coating composition was applied to each of cleaned injection-molded products of an aluminum alloy by an electric-field flowing electrostatic coating machine (a simplified tester) made by Mesac, Co., and cured at 180° C. for 20 minutes, thereby forming a coating film having a thickness of 20 to 50 μm. Each of the coating films was observed for examination of the realization of a pattern, the uniformity of the coating film, the presence or absence of blisters of the coating film and the hiding of wrinkles. Results are shown in Table 1.

TABLE 1

| Observed Item Sample | Realization of pattern | Uniformity of coating film | Presence or absence of blister of coating film | Hiding of wrinkles |
| --- | --- | --- | --- | --- |
| Example 1 | ○ | ○ | ○ | Δ |
| Example 2 | ○ | ○ | ○ | Δ |
| Example 3 | ○ | ○ | ○ | ○ |
| Example 4 | ○ | ○ | ○ | Δ |
| Example 5 | ○ | ○ | ○ | ○ |
| Example 6 | ○ | ○ | ○ | ○ |
| Comparative Example 1 | X | ○ | X | ○ |
| Comparative Example 2 | ○ | X | ○ | ○ |
| Comparative Example 3 | ○ | ○ | ○ | X |

All of the realization of a pattern, the uniformity of the coating film, the presence or absence of blister of the coating film and the hiding of wrinkles in Table 1 were judged with the naked eye. The realization of a pattern is represented by ○, when the coating film looks like a satin, by Δ when the coating film looks fairly like a satin, and by X when the coating film does not look like a satin; and the uniformity of the coating film is represented by ○ when the coating film has an excellent uniformity of its appearance, by Δ when the coating film has a fairly good uniformity of its appearance; and by X when the coating film has a poor uniformity of its appearance and a remarkable discoloration. The presence or absence of the blister of the coating film is represented by ○ when the coating film has not blister, by Δ when the coating film has little blister, and by X when Δ when the coating film has many blisters. The hiding of wrinkles is represented by ○ when no wrinkle is observed in the coating film, by Δ when wrinkles are little observed in the coating film, and by X when wrinkles are observed distinctly.

It can be seen from Table 1 that all of the powder coating compositions produced in Examples 1 to 6 were judged as being ○ or Δ for all the items and excellent in all the item. Thus, there is completely or substantially no problem in all these compositions.

On the other hand, in the powder coating composition of comparative Example 1 made using the filler (settleable barium) having the average particle size of 0.6 μm, the realization of pattern is poor, and blisters were produced in the coating film.

In the powder coating composition of Comparative Example 2 containing only the organic filler and no inorganic filler, the uniformity of the coating film was poor.

Further, in the powder coating composition of Comparative Example 3 made using the polyester resin having a considerably high melt-viscosity of 200 Pa·s/165° C., the hiding of wrinkles was insufficient.

What is claimed is:

1. A powder coating composition for use in the coating of a molded product having wrinkles, cavities and the like on its surface, comprising a film forming resin and a filler, wherein the film forming resin is one or more selected from the group consisting of an epoxy resin, a polyester resin and an acrylic resin, each having a melt viscosity of 60 Pa·s/165° C. or less, the filler comprises a combination of at least two types of fillers, each having a different particle size in a range of 3 to 100 μm, and 5 to 200 parts by weight of the fillers are present per 100 parts by weight of the film forming resins such that, when applied, the composition uniformly coats a molded product without blistering or wrinkles.

2. A powder coating composition according to claim 1, wherein the filler has a melting point of 120° C. or more.

3. A powder coating composition according to claim 1, wherein said molded product is one made by a die-casting process, an extruding process or an injection molding process.

4. A powder coating composition according to claim 1, wherein said powder coating composition has an average particle size in a range of 5 to 60 μm.

* * * * *